(12) United States Patent
Reuter et al.

(10) Patent No.: US 11,629,652 B2
(45) Date of Patent: Apr. 18, 2023

(54) METERING PUMP SYSTEM

(71) Applicant: Hamilton Sundstrand Corporation, Charlotte, NC (US)

(72) Inventors: Charles E. Reuter, Granby, CT (US); Morgan O'Rorke, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 23 days.

(21) Appl. No.: 16/782,510

(22) Filed: Feb. 5, 2020

(65) Prior Publication Data

US 2021/0239054 A1 Aug. 5, 2021

(51) Int. Cl.
*F02C 9/26* (2006.01)
*F02C 7/232* (2006.01)
*F02C 7/236* (2006.01)
*F02C 9/30* (2006.01)
*F02C 9/32* (2006.01)

(52) U.S. Cl.
CPC .............. *F02C 9/263* (2013.01); *F02C 7/232* (2013.01); *F02C 7/236* (2013.01); *F02C 9/30* (2013.01); *F02C 9/32* (2013.01); *F05D 2220/323* (2013.01); *F05D 2270/3015* (2013.01)

(58) Field of Classification Search
CPC .... F02C 9/263; F02C 9/32; F02C 9/30; F02C 7/232; F02C 7/236
See application file for complete search history.

(56) References Cited

U.S. PATENT DOCUMENTS

| | | | |
|---|---|---|---|
| 2,653,543 A * | 9/1953 | Mott | F04B 49/007 417/252 |
| 3,908,360 A | 9/1975 | Meyer et al. | |
| 3,946,551 A * | 3/1976 | Linebrink | F04B 23/14 417/322 |
| 4,208,871 A * | 6/1980 | Riple, Jr. | F02C 9/30 417/252 |
| 6,675,570 B2 * | 1/2004 | Herbison | F02C 9/30 60/39.281 |
| 7,347,050 B2 * | 3/2008 | Gainford | F02C 7/22 60/734 |
| 7,836,676 B2 * | 11/2010 | Futa, Jr. | F02C 7/232 60/734 |
| 9,140,190 B2 * | 9/2015 | Portolese | F02C 7/232 |
| 10,267,237 B2 * | 4/2019 | Pool | F02C 9/38 |
| 10,317,082 B2 * | 6/2019 | McBrien | F02C 7/222 |
| 11,060,461 B2 * | 7/2021 | Turney | F02C 7/236 |
| 2001/0054290 A1 | 12/2001 | Herbison et al. | |

(Continued)

FOREIGN PATENT DOCUMENTS

EP 1662117 A2 5/2006
EP 3228847 A1 10/2017

OTHER PUBLICATIONS

Extended European search report issued in corresponding EP aplication No. 21155521.4, dated Jun. 24, 2021.

*Primary Examiner* — Alain Chau
(74) *Attorney, Agent, or Firm* — Locke Lord LLP; Scott D. Wofsy; Alicia J. Carroll

(57) ABSTRACT

A fuel system including a fuel tank, a first pump fluidly coupled to the fuel tank configured for distributing fuel from the fuel tank throughout the fuel system, and a second pump fluidly coupled to the first pump by a pressure regulating valve and configured for driving fuel to an engine.

10 Claims, 2 Drawing Sheets

(56) References Cited

U.S. PATENT DOCUMENTS

| | | | |
|---|---|---|---|
| 2005/0268972 A1* | 12/2005 | Gainford | F02C 9/263 137/601.14 |
| 2008/0296403 A1* | 12/2008 | Futa, Jr. | F02C 7/232 239/95 |
| 2010/0126136 A1* | 5/2010 | Anson | F02C 7/22 60/734 |
| 2010/0242431 A1 | 9/2010 | Baker | |
| 2012/0271527 A1* | 10/2012 | Zebrowski | F02C 9/30 701/100 |
| 2013/0327044 A1* | 12/2013 | Portolese | F02C 7/232 60/734 |
| 2014/0196463 A1 | 7/2014 | Zielinski et al. | |
| 2016/0047550 A1* | 2/2016 | McBrien | F02C 7/222 60/734 |
| 2016/0084272 A1 | 3/2016 | Mueller et al. | |
| 2016/0146108 A1 | 5/2016 | Yates et al. | |
| 2016/0245188 A1* | 8/2016 | Selstad | G01F 13/00 |
| 2016/0265444 A1* | 9/2016 | Pool | F02C 7/236 |
| 2017/0101935 A1 | 4/2017 | Waissi et al. | |
| 2017/0167387 A1 | 6/2017 | Weir et al. | |
| 2017/0306856 A1 | 10/2017 | Bickley | |
| 2018/0045122 A1* | 2/2018 | Veilleux | F01D 21/003 |
| 2019/0257250 A1 | 8/2019 | Veilleux, Jr. et al. | |

\* cited by examiner

METERING PUMP SYSTEM

BACKGROUND

Technological Field

The present disclosure relates to metering pump system, and more particularly to fuel metering pump system.

Description of Related Art

A variety of devices are known for metering fuel. Modern military jet engines typically face serious thermal management concerns with fuel temperatures at tolerable limits. Future engine and airframe systems will likely push performance such that fuel temperatures become the limiting factor. Systems will be required to handle increasing fuel temperatures by minimizing fuel handling leading to increased temperatures. Although conventional methods and systems have generally been considered satisfactory for their intended purpose, there is a need in the art for systems allowing for a significant reduction of motor and controller sizes along with decreased power requirement. There also remains a need in the art for such metering and components that are economically viable. The present disclosure may provide a solution for at least one of these remaining challenges.

SUMMARY OF THE INVENTION

A fuel system, which can be part of an aircraft, includes a fuel tank, a first pump fluidly coupled to the fuel tank configured for distributing fuel from the fuel tank throughout the fuel system, and a second pump fluidly coupled to the first pump by a pressure regulating valve and configured for metering fuel to an engine. The first pump can be a non-positive displacement pump, such as a shaft driven centrifugal pump with a throttling type regulating valve. The first pump can also be a positive displacement pump with a bypassing pressure regulating valve to bypass flow from the pump outlet to the pump inlet, thereby making the system a pressure-raising device.

The second pump can be a positive displacement pump, electrically driven by an electric motor and independent of the first pump. The second pump can meter flow to a gas turbine engine and metered flow will be proportional to pump speed. The first pump can be sized to provide more pressure than the second pump, approximately provide 10-15 times the pressure of the second pump. A mass flow meter can be located downstream of the second pump configured to provide feedback to a speed control of the second pump and to trim a steady-state fuel delivery to improve the accuracy. The mass flow meter can further be used for system health monitoring to determine pump health.

The pressure regulating valve can be hydro-mechanically controlled and be configured to regulate a pressure rise across the second pump by either throttling the first pump discharge if it is a centrifugal pump or bypassing some of the first pump flow if it is a positive displacement pump.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
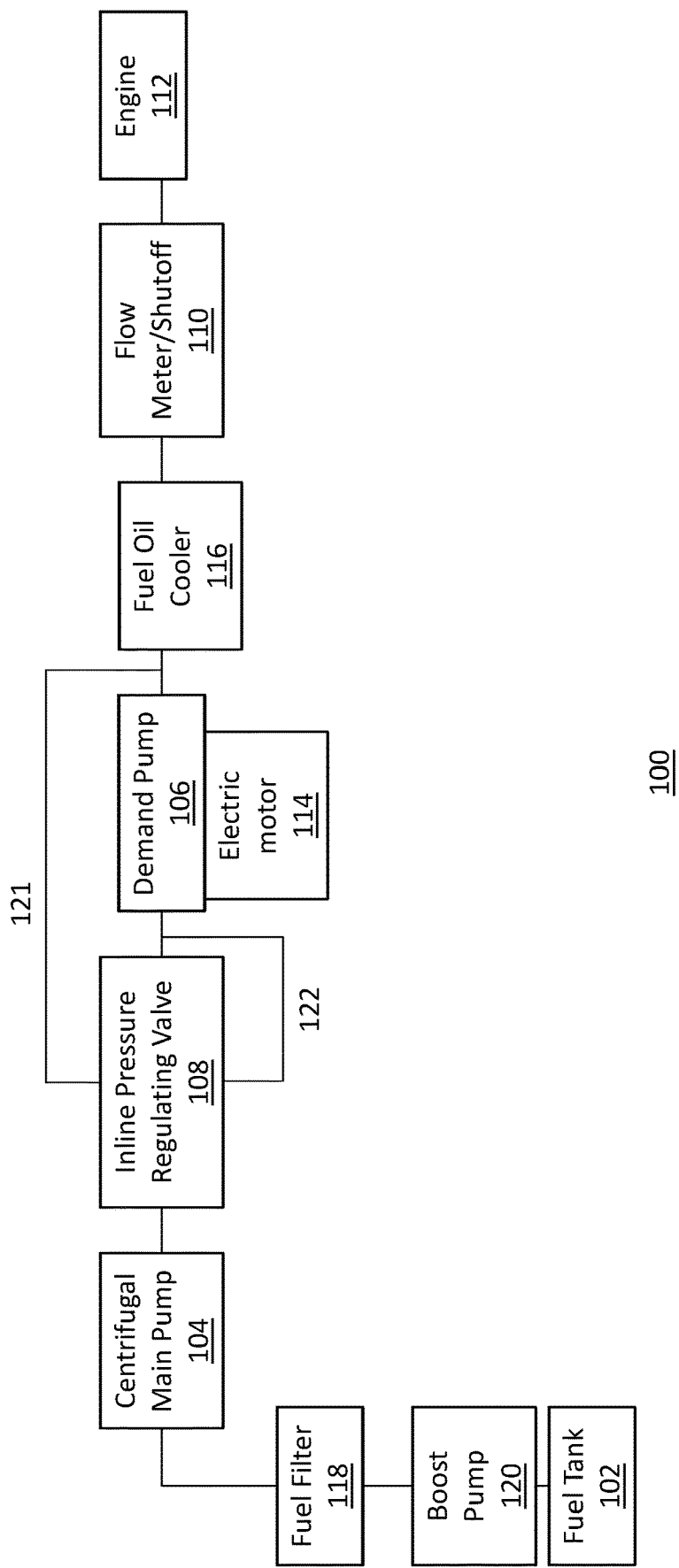
FIG. 1 is a block diagram view of a metering system including a centrifugal first pump according to the disclosure.
Figure 2:
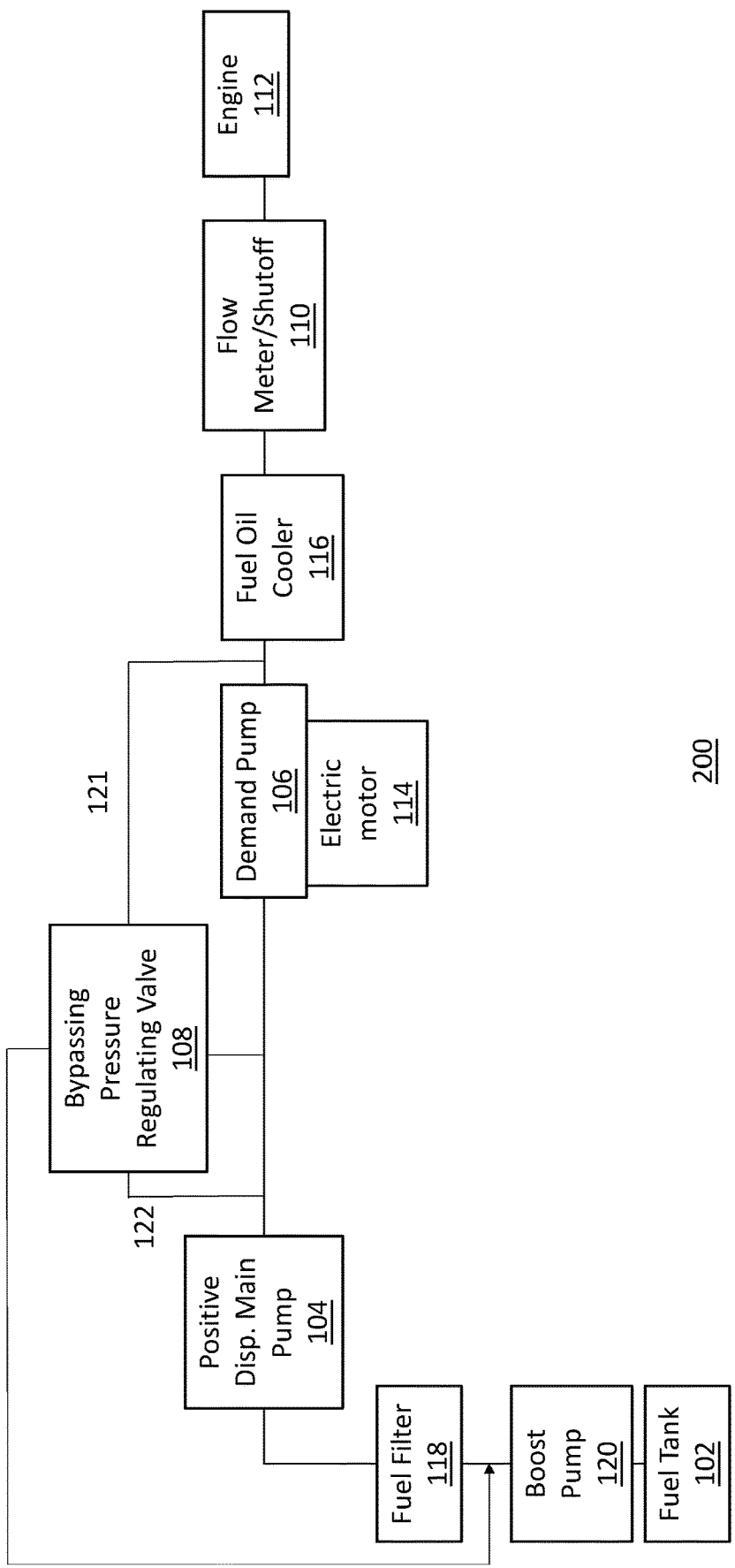
FIG. 2 is a block diagram view of a metering system including a positive displacement first pump according to the disclosure.

Reference will now be made to the drawings wherein like reference numerals identify similar structural features or aspects of the subject invention. For purposes of explanation and illustration, and not limitation, a partial view of an exemplary embodiment of a metering system in accordance with the invention is shown in FIG. 1 and FIG. 2 and is designated generally by reference characters 100 and 200. The methods and systems of the disclosure can be used to allow for a significant reduction in electric motor and controller size for the metering pump compared to an architecture that requires that the metering pump alone generate required discharge pressure.

FIG. 1 shows a fuel system 100, as part of an aircraft system, including a fuel tank 102, a first pump 104 fluidly coupled to the fuel tank 102. The first pump 104 is configured for distributing fuel from the fuel tank 102 throughout the fuel system 100. A second pump 106 is fluidly coupled to the first pump 104 by a pressure regulating valve 108 and configured for metering fuel to an engine 112. A fuel oil cooler 116 is located downstream of the second pump 106. The first pump 104 can be a non-positive displacement pump, such as a shaft driven centrifugal pump. In this case the regulator 108 is an throttling type regulator which will throttle first pump 104 flow as required to modulate a pressure drop between first pump 104 and second pump 106 to regulate a constant pressure rise across pump 106. A boost pump 120 and fuel filter 118 are in line between the fuel tank 102 and main pump 104.

As shown in FIG. 2, the system 200 shows the first pump 104 as a positive displacement pump including a bypass pressure regulating valve 108 instead of a throttling regulator. In this case the pressure regulator valve will bypass back to the first pump 104 the flow necessary to regulate a constant pressure rise across pump 106.

The second pump 106 in both systems 100 and 200 is a positive displacement pump, electrically driven by an electric motor 114 and independent of the first pump 104. Flow delivered by the second pump is proportional to pump rotational speed. The first pump 104 is sized to provide more pressure than the second pump 106, approximately provide 10-15 times the pressure of the second pump 106. Thus significant power associated with raising the fuel pressure for delivery to the gas generator is offloaded to the mechanically-driven high-speed first pump stage 104. The fixed pressure rise provided by regulator 108 across the second pump 106 enables increased accuracy in open loop fuel metering control by reducing variation in volumetric efficiency. A mass flow meter 110 is located downstream of the second pump 106 in order to provide feedback to a speed control of the second pump 106 and to trim a steady-state fuel delivery to improve the accuracy and provide shutoff functionality. The mass flow meter 110 can further be used for system health monitoring to determine pump health.

The pressure regulating valve 108 is hydro-mechanically controlled and regulates a constant pressure rise across the second pump 106. The pressure regulating valve 108 can be either a throttling type regulator if the first pump 104 is a centrifugal type pump (as shown in FIG. 1) or a bypassing regulator if the first pump 104 is a positive displacement type pump (as shown in FIG. 2). Both types of regulator sense pressures upstream and downstream of the second pump 106 through hydraulic sense lines 121.

The arrangement enables simplification of fuel metering by eliminating a metering valve within the system. Fuel system power is also reduced relative to a single gearbox driven pump at heat management critical conditions such as idle and cruise since the second pump 106 delivers only the flow demand for the engine 112 while reducing the pressure rise required by the first pump at its sizing condition thus reducing pump parasitic losses at off design conditions. Significant reduction in electric motor and controller size for the second pump 106 compared to an architecture that requires that a metering pump alone generate required discharge pressure. The significant power associated with raising the fuel pressure for delivery to the gas generator is offloaded to the mechanically-driven high-speed main stage 104, thereby greatly reducing the electrical power needed to drive the second pump 106.

The methods and systems of the present disclosure, as described above and shown in the drawings, provide for a fuel metering system with superior properties including improved efficiency reducing fuel system heat rejection and fuel temperature. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A fuel system comprising:
    a fuel tank;
    a first pump fluidly coupled to the fuel tank configured for distributing fuel from the fuel tank throughout the fuel system, wherein the first pump is a positive displacement pump;
    a second pump fluidly coupled to the first pump by a pressure regulating valve and configured to meter fuel to an engine, wherein the pressure regulating valve is a throttling regulator, and is configured to introduce a pressure drop between the first and second pumps to maintain a pressure rise, wherein the pressure regulating valve is hydro-mechanically controlled;
    first and second hydraulic sense lines, wherein the first hydraulic sense line is operatively connecting the pressure regulating valve to downstream from the second pump, and the second hydraulic sense line operatively connecting the pressure regulating valve to upstream from the second pump;
    a fuel filter positioned upstream from the first pump, between the fuel tank and first pump; and
    a mass flow meter downstream of the second pump configured to provide feedback to a speed control of the second pump and to trim a steady-state fuel delivery, wherein the mass flow meter provides a shut off to the engine.

2. The fuel system of claim 1, wherein the pressure regulating valve is a bypassing valve, and is configured to bypass flow as necessary from the first pump to maintain a constant pressure rise across the second pump.

3. The fuel system of claim 1, wherein the first pump is shaft driven.

4. The fuel system of claim 1, wherein the second pump is a positive displacement pump.

5. The fuel system of claim 4, wherein the second pump is electrically driven independent of the first pump.

6. The fuel system of claim 5, wherein the second pump is electrically driven by an electric motor.

7. The fuel system of claim 1, wherein the first pump is sized to provide more pressure than the second pump.

8. The fuel system of claim 7, wherein the first pump is sized to provide 10-15 times the pressure of the second pump.

9. The fuel system of claim 1, wherein the pressure regulating valve is configured to regulate a pressure rise across the second pump.

10. The fuel system of claim 1, wherein the fuel system is part of an aircraft.

* * * * *